A. D. WEBSTER.
SYSTEM OF CONTROL.
APPLICATION FILED MAY 14, 1921.

1,438,624.

Patented Dec. 12, 1922.

WITNESSES:

INVENTOR
Alfred D. Webster.
BY
ATTORNEY

Patented Dec. 12, 1922.

1,438,624

UNITED STATES PATENT OFFICE.

ALFRED D. WEBSTER, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed May 14, 1921. Serial No. 469,422.

*To all whom it may concern:*

Be it known that I, ALFRED D. WEBSTER, a citizen of the United States, and a resident of Wilkinsburg, in the county of Allegheny and State of Pennsylvania, have invented a new and useful Improvement in Systems of Control, of which the following is a specification.

My invention relates to control systems and it has particular relation to the protection of control systems from excessive overload conditions.

The object of my invention is to provide means for protecting a plurality of motors from an excessive overload throughout the acceleration and normal operation of the motors.

More fully stated, the object of my invention is to provide a relay for governing the operation of a circuit-breaker that will be responsive to overload conditions during the period the motors are operating in series relation and also during their operation in parallel relation.

Heretofore, the overload relay governing the operation of a circuit-breaker of a control system has been set for opening upon the current becoming excessive, when the motors were connected in parallel relation only, and, consequently, the relay afforded inadequate protection when the motors were operating in series relation, as the normal current that was traversing the system was approximately one-half of that which was employed during the period when the motors were in parallel relation.

Briefly speaking, my invention consists in providing a relay having a plurality of actuating coils for governing the operation of a line switch or circuit-breaker connecting one of the coils of the relay in series relation with a plurality of motors that are governed by the control system and having the energization of the other coil governed by one of the series-parallel contactors.

For a better understanding of my invention, reference may be made to the accompanying drawing;

Figure 1 of which is a schematic view of a control system embodying my invention;

Figure 1:
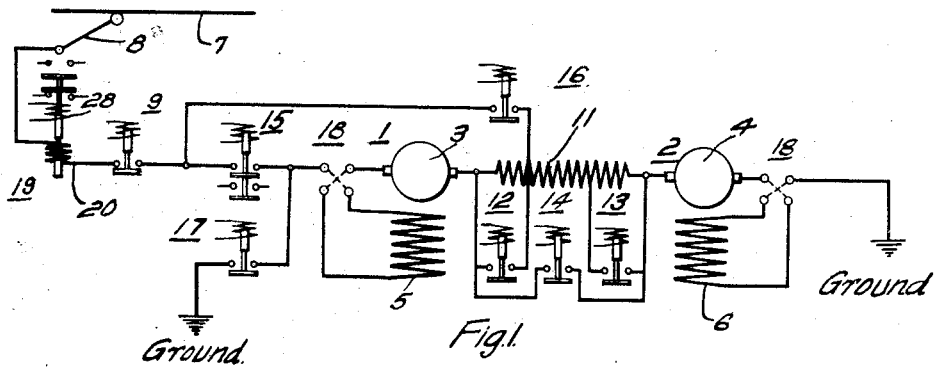

Referring to Fig. 1 of the drawing, a plurality of motors 1 and 2 having armatures 3 and 4, respectively, and series field-magnet windings 5 and 6, respectively, are energized from a trolley 7 through the trolley-pole 8 upon closure of the line switch or circuit-breaker 9. A starting resistor 11 is employed to govern the energization of the motors 1 and 2, and portions thereof may be shunted by means of accelerating contactors 12, 13 and 14.

The motors 1 and 2 may be connected in series relation by means of series contactor 15 and they may be connected in parallel relation by means of the parallel contactors 16 and 17. A reversing drum 18 is employed for reversing the relation of the series field-magnet windings 5 and 6 to the armatures 3 and 4, respectively, of the corresponding motors 1 and 2. A series coil 20, forming part of an overload relay or trip 19, is positioned between the trolley 8 and the circuit-breaker 9. The relay 19 is provided with a second actuating coil 28, as hereinafter more fully set forth.

Figure 3:
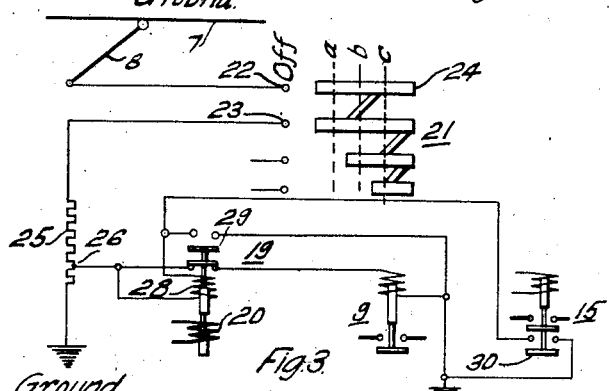
Fig. 3 is a diagrammatic view of a portion of the auxiliary circuits governing the control system shown in Fig. 1.
Figure 2:
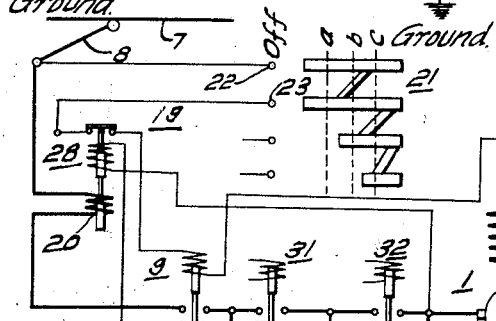
Fig. 2 is a sequence chart showing the order of closure of the switches or contactors employed in the control system illustrated in Fig. 1.

Referring to Fig. 3 of the drawing, a master controller 21 is employed to govern the circuit-breaker 9 and the series, parallel and accelerating contactors 12 to 17, inclusive. For the sake of clearness, only so much of the auxiliary circuits are shown as are necessary to illustrate my invention.

The controller 21 has an "off" position, a low-speed series position $a$, a full-speed series position $b$ and a full-speed parallel position $c$. When the master controller 21 is actuated to position $a$, a circuit is established from trolley 7 through contact terminals 22 and 23 of the master controller 21, which are bridged by contact segment 24, and auxiliary or control resistor 25 to ground.

The circuit-breaker or line switch 9 is energized by a circuit that extends from a tap-point 26 of the control resistor 25 through the lower contact member of the overload relay 19 and the actuating coil of the circuit-breaker 9 to ground.

As the actuating coil 20 of the overload relay 19 carries only approximately one-half the current when the motors 1 and 2 are operating in series relation that it carries when the motors 1 and 2 are operating in parallel relation, it would take an injuriously high overload for the actuating coil 20 to open the relay 19. However, when the series contactor 15 assumes its closed position, a circuit comprising the actuating coil 28 of the relay 19 is established by an auxiliary contact member or interlock 30 that is actuated by the contactor 15. This circuit extends from the tap-point 26 of the control resistor 25 through the actuating coil 28 of the relay 19 and the auxiliary contact member 30 of the series contactor 15 to ground.

The terminal connections and designs of the actuating coils 20 and 28 are such that the magnetic fields established by the coils are cumulative, wherefore the overload relay 19 operates upon the occurrence of a smaller overload than if only the actuating coil 20 were energized. As soon as the series contactor 15 opens, the circuit comprising the actuating coil 28 is broken, and the overload relay 19 must be operated solely by the series coil 20 upon the occurrence of an overload upon the motors 1 and 2, when they are operated in parallel relation.

A holding circuit for maintaining the relay 19 in its open position after it has been actuated thereto by the occurrence of an excessive overload is provided from the tap-point 26 of the auxiliary control resistor 25 through the actuating coil 28 of the relay 19 and the auxiliary contact member 30 of the series contactor 15 to ground.

The terminal connections and designs of the actuating coils 20 and 28 are such that the magnetic fields established by the coils are cumulative, wherefore the overload relay 19 operates upon the occurrence of a smaller overload than if only the actuating coil 20 were energized. As soon as the series contactor 15 opens, the circuit comprising the actuating coil 28 is broken, and the overload relay 19 must be operated solely by the series coil 20 upon the occurrence of an overload upon the motors 1 and 2, when they are operated in parallel relation.

A holding circuit for maintaining the relay 19 in its open position after it has been actuated thereto by the occurrence of an excessive overload is provided from the tap-point 26 of the auxiliary control resistor 25 through the actuating coil 28 of the relay 19 and the auxiliary contact member 29, which forms part of the relay 19, to ground. The relay 19 will thus return to its closed position only after the master controller 21 has been actuated to its "off" position.

Figure 4:
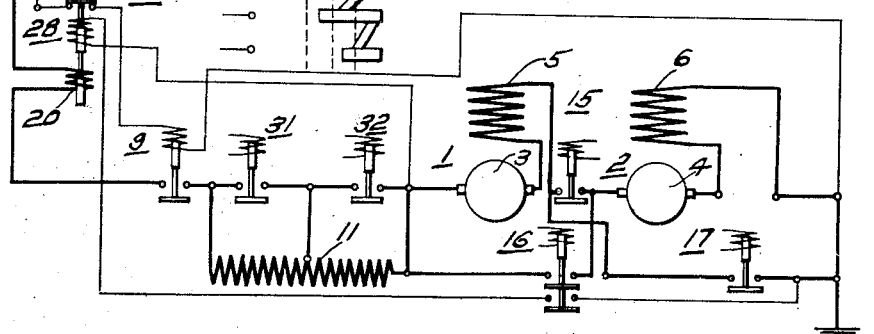
Fig. 4 is a modified form of the control system shown in Fig. 1.

Referring to Fig. 4 of the drawing, like elements have been given like reference characters. However, only two accelerating contactors 31 and 32 are employed for shunting the starting resistor 11, which is located between the trolley 7 and the motors 1 and 2. The actuating coils 20 and 28 of the relay 19 are so arranged that their magnetic fields will oppose one another, and the energization of the actuating coil 28 is governed by parallel-connecting contactor 16. The actuating coil 20 of the relay 19 is designed to open the relay 19 when the current is excessive in the motors 1 and 2 during the period when they are operating in series relation.

When the motors 1 and 2 are connected in parallel relation by means of contactors 16 and 17, the motors 1 and 2 are energized by a circuit from the trolley 7 through actuating coil 20, contact members of the circuit-breaker 9, starting resistor 11, where the circuit divides, one branch including motor 1 and switch 17, the other branch including switch 16 and motor 2, whence a common circuit is completed to ground. An auxiliary circuit is continued from the resistor 11, through the actuating coil 28 of the relay 19 and interlock 16-in to ground. As the energization of the motors 1 and 2 is further increased by the closing of the contactors 31 and 32 after the motors have been connected in parallel relation, the energization of the actuating coil 28 will be further increased, making it responsive to the accelerating changes of the control system. The field established by the energization of the actuating coil 28 of the relay 19 is adapted to oppose the magnetic field established by the actuating coil 20 of the relay 19, thereby raising the current setting at which the overload relay 19 will open upon the occurrence of overload conditions during parallel operation of the motors as compared with series operation thereof.

From the above description, it is apparent that I have employed a single relay which will adequately protect a motor-control system during both the period in which the motors are operating in parallel relation and also during the starting period when the motors are operating in series relation.

While I have shown my invention in two preferred forms, it is to be understood that further modifications may be made in the arrangement of circuits and apparatus employed without departing from the spirit of my invention. I desire, therefore, to be limited only by the scope of the appended claims.

I claim as my invention:

1. In a control system, the combination with a plurality of dynamo-electric machines, of a switch for connecting said machines to an external circuit, means for connecting said machines in different relations one to another, and means comprising a relay having a plurality of actuating coils for governing the operation of said switch, one of said coils being energized during the energization of said machines and the other of said coils being energized only during the period said machines are in a predetermined relation.

2. In a control system, the combination with a plurality of dynamo-electric machines, of a switch for connecting said machines to an external circuit, means comprising a plurality of contactors for varying the voltage of said machines, and means comprising a relay having a plurality of actuating coils for governing said switch, the energization of one of said coils being governed by the position of one of said contactors.

3. In a control system, the combination with a plurality of motors, means comprising a plurality of contactors for connecting said motors in different relations one to another, means for energizing said motors and means comprising a relay having a plurality of actuating coils for governing said energizing means, one of said coils being in series relation with one of said motors and the other of said coils being energized during the period one of said contactors occupies a predetermined position.

4. In a control system, the combination with a plurality of motors, of a circuit-breaker, a contactor for connecting said motors in series relation, a plurality of contactors for connecting said motors in parallel relation and a relay having a plurality of actuating coils for governing the operation of said circuit-breaker, one of said coils being in series relation with said motors and the energization of the other coil being governed by the position of said series contactor.

5. In a control system, the combination with a plurality of dynamo-electric machines, of means for energizing said machines, means for varying the energization of said machines, and means comprising a relay having a plurality of actuating coils for governing said energizing means, one of said coils being energized during the energization of said machines and the other of said coils being energized only while said machines are in a predetermined relation.

6. In a control system, the combination with a plurality of dynamo-electric machines, of a switch for connecting said machines to an external circuit, means for connecting said machines in different relations one to another and means comprising a relay having a plurality of actuating coils for governing said switch, said coils being so energized that their attractive forces are cumulative while said machines are connected in one relation.

7. In a control system, the combination with a plurality of dynamo-electric machines and a switch for energizing said machines, of a relay for governing said switch, said relay having a plurality of actuating coils, one of said coils being connected permanently in series relation with one of said machines and the other of said coils being energized upon said machines being connected in predetermined relation one to another, the energization of said second coil maintaining said relay in its open position after the occurrence of an electrical overload upon said machine.

8. In a control system, the combination with a plurality of dynamo-electric machines and a switch for energizing said machines, of a relay having a plurality of positions for governing said switch, said relay having a plurality of actuating coils, one of said coils being energized only during predetermined conditions and after said relay has been actuated from its normal position.

9. In a control system, the combination with a plurality of dynamo-electric machines and a switch for energizing said machines, of means comprising a controller for connecting said machines in different relations, a line switch governed by said controller, a relay having a plurality of positions for governing said switch, said relay having a plurality of actuating coils, one of said coils being energized only during predetermined conditions and after said relay has been actuated from its normal position, and means for preventing said relay from returning to its normal position until after said controller has been returned to its normal position.

10. In a control system, the combination with a plurality of motors, of means comprising a plurality of contactors for connecting said motors in different relations, a controller having a plurality of positions for governing said contactors and means comprising a relay having a plurality of actuating coils for governing the energization of said motors, one of said coils being energized only upon one of said contactors occupying a predetermined position, and means for preventing said motors from being re-energized prior to said controller being returned to its off position.

In testimony whereof, I have hereunto subscribed my name this 10th day of May, 1921.

ALFRED D. WEBSTER.